UNITED STATES PATENT OFFICE.

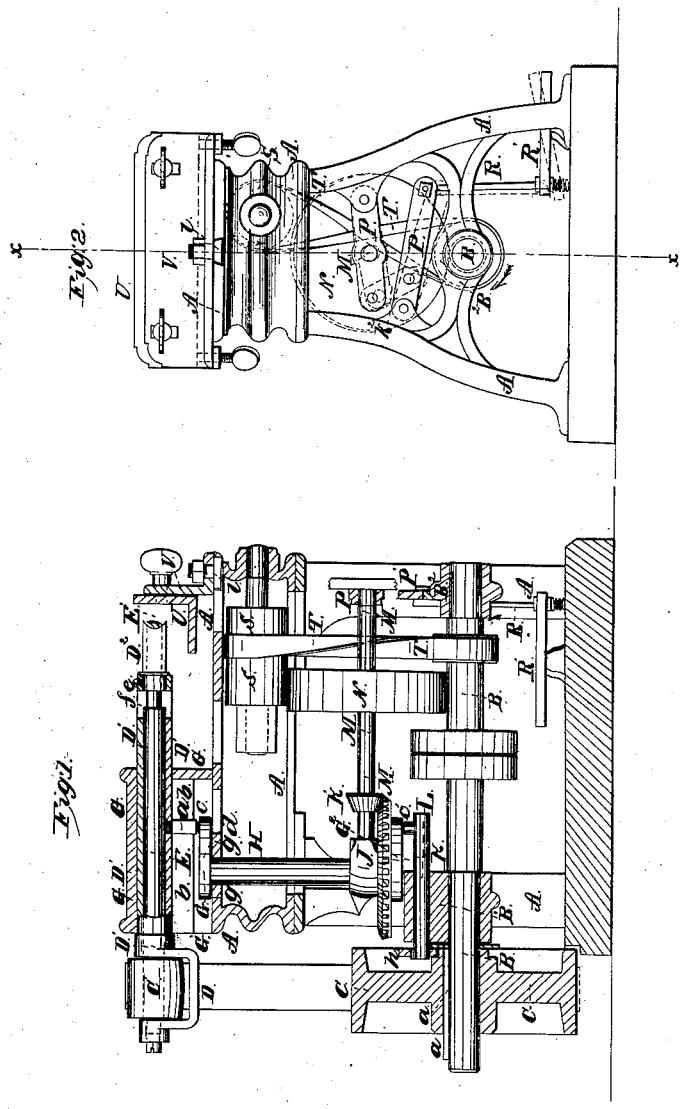

LOVETT EAMES, OF KALAMAZOO, MICHIGAN.

MORTISING-MACHINE.

Specification of Letters Patent No. 27,895, dated April 17, 1860.

*To all whom it may concern:*

Be it known that I, LOVETT EAMES, of Kalamazoo, in the county of Kalamazoo and State of Michigan, have invented certain new and useful Improvements in Mortising-Machines; and I do hereby declare that the following is a full, clear, and exact description thereof, reference being had to the accompanying drawings, forming a part of this specification, in which—

Figure 1, represents a vertical longitudinal section taken through my improved machine, showing the construction and arrangement of the several parts thereof as seen in a sectional view. Fig. 2, is an end view of the machine showing the treadle and its accompanying parts for giving motion to the cam shaft and for regulating the depth of mortise to be cut by reversing the movement of said shaft. Fig. 3, is a plan or top view of one of the cams for reciprocating the mortising tool, the peculiar configuration of the cam slot is shown by this figure.

Similar letters of reference indicate corresponding parts in the three figures.

The object of this invention and improvement in mortising machines is to throw into and out of gear the mortising tool, and for reversing the movement of the same at any desirable moment without shifting belts or stopping the rotary motion of the auger to adjust the parts, at the same time to have the mortising tool advance or recede from the timber instead of the timber to the tool.

For this purpose my invention consists: firstly, in giving a rotary motion to the auger and at the same time an alternate reciprocating movement to the chisel stock by means of a friction wheel and counter shaft, which is hung at one end in a movable bearing arm operated by a suitable treadle so as to bring its periphery in contact with the main shaft at pleasure, and in conjunction therewith is arranged a pinion bevel gear wheel for rotating a cam shaft for giving the advancing and receding motion to the mortising chisel and for giving a simultaneous movement to the belt wheel on the main shaft as will be hereinafter described and represented; secondly, it consists in arranging above the friction roller a counter roller, which receives its motion from the main shaft by a belt or suitable gearing, whereby the friction roller may be made to reverse its motion, and thus give an instantaneous receding movement to the auger and chisel for the purposes and in the manner hereinafter to be described.

To enable those skilled in the art to fully understand my invention I will proceed to describe its construction and operation.

In the drawings, A, represents the supporting table for the several parts for effecting the mortising operation.

B, is the main shaft turning in boxes B', B², and receiving its motion from any convenient prime mover by a belt which passes around a pulley on the shaft, situated at any suitable point, by the side of which may be placed a loose pulley for receiving the driving belt when it is desired to stop the motion of the machine.

C is a belt wheel which is prevented from turning on shaft B, by a key tenon $a$, projecting from the shaft into a slot, in the hub of the wheel as clearly shown by Fig. 1. This allows the belt wheel to move along the shaft without turning on the shaft. Directly above wheel C is a smaller wheel C', which has its bearings in a yoke D, on the rear end of the chisel stock or mandrel D', the axis of this wheel, is in common with the axis of the tool stock, and this wheel is keyed to the auger spindle E, and gives motion, the auger E', and receives its motion from the wheel C, by a belt as represented by the red line Fig. 1.

The chisel stock, is necessarily bored out to receive the auger E', but this stock is prevented turning in its bearing box G, by a guide bar $a$, which is fixed to the stock and passes down through a longitudinal slot $b$ in the box as clearly shown (Fig. 1) and plays back and forth in this slot with the movement of the chisel stock and auger; on the lower end of the guide bar $a$, is a pin $c$, which fits into a slot $d$, (Fig. 3) in cam G', and it is this cam that gives an alternate reciprocating movement to the chisel stock D', and consequently to the auger E', as will be hereinafter described.

The stock D', passes longitudinally through box G, which box is bolted down to one end of the table A, and receives on its end a hollow four-sided, or other shaped chisel D², which is fixed in its place by a set screw $e$. This screw will allow the chisel to be removed and another introduced in its stead. In the rear of the chisel, and in the end of its stock is an opening *f*, which allows the chips to freely escape behind the chisel. A tube may be here introduced for conducting the chips from the auger away from the machine. It is necessary to state that the auger and chisel may be detached and others introduced in their place, with the same facility as if they were in an ordinary brace.

The cam G', is keyed eccentrically to a perpendicular shaft H, which has its upper bearings in a plate *g*, of the table top and its lower bearing in bracket J, and carries on its lower end a large bevel wheel K, underneath of and affixed to which is an eccentric cam G², the slot in which is concentric with that in cam G'. The slotted face of the cam however is inverted. This lower cam imparts to the belt wheel C, an independent motion of that received from its main shaft B, but a simultaneous movement with that of the chisel stock and auger, this is obtained through the medium of a small shaft L, carrying on one end a pin *c'*, which works in the slot of the cam, and on the other a yoke *h* which passes into an annular slot on the hub of the belt wheel C. The shaft L, is prevented from turning by a key tenon, and as the cam shaft is turned, this shaft L, plays back and forth with a movement corresponding to that given to the mortising tools by the upper cam G', and the belt wheel C, receives by this arrangement an alternate reciprocating motion on its shaft independent of its rotary motion and the belt communicating with wheel C', above it is always kept in a perpendicular line with the axes of these wheels.

The bevel gear wheel K, engages with a pinion gear K', on counter shaft M, which is the driving shaft of the cam shaft H, and this shaft M, receives its motion from the main shaft by a large friction wheel N, keyed to shaft M.

The counter shaft is directly above the main shaft and has its fixed bearing in bracket J, and its movable bearing in a lever P, shown in Fig. 2 which lever is pivoted at one end to a leg of the table A, and at its other to a link K², which link is again pivoted to a secondary lever P', one end of which is pivoted to the opposite leg of the table and the other end is connected to a treadle bar R, which passes down and is secured to foot lever R', resting on the base of the machine. The object of this system of levers, or compound lever is to enable the operator, with his foot to exert a sufficient power, on the free end of the counter shaft to bring the friction wheel into contact with the main shaft, and prevent it from slipping on this shaft. Also to enable the operator to effect an instantaneous reverse movement of the counter shaft by a simple movement of the foot treadle, which forms the subject of my second claim. This reverse movement of the counter shaft is obtained by simply arranging a roller, or cylindrical drum S, over the friction wheel N, and in such relation to this wheel N, that it may be brought forcibly in contact with the drum by pressing with the heel on the foot lever. The drum S, is driven by a band T, from the main shaft C, as shown by Figs. 1 and 2. The main shaft and the drum S, is kept in constant motion while the counter shaft friction wheel may be alternately brought in contact with both by rocking the foot lever R', and by this means an advancing and receding movement will be communicated to the chisel and auger independent of the rotary movement of the auger; the mortising operation is thus brought under perfect control of the operator.

The peculiarity of the cams G', G², is, that the auger and chisel are driven forward with a uniform force and velocity during about two thirds of their revolution and then by the eccentricity of the cam the tools are started back as soon as the turning point is passed, by a powerful and slow movement at first, but which rapidly increases in velocity as the chisel is loosened, and which takes the tools back to their starting point during the remainder of the revolution of the cam and bevel wheel G'.

The table or shelf U, for holding the stuff to be mortised consists of a right angular metal frame, in length equal at least to the width of the top of the table A. This shaft is adjustable in a bracket V, so that it may be raised or depressed, and established at any desirable point, the bracket V, rests on the bed of the table A, and it is also made adjustable to or from the mortising tools by a dove tail tenon block *l*, which is fitted into a corresponding longitudinal slot made in the end of the table bed. The block *l*, is the head of a screw block which receives a nut on its end for securing the whole down to the table top. The bracket V, can be set at any desired angle with the mortising tools, so as to cut or beat a mortise diagonally with the face of the stuff. This shelf for holding the stuff and by which it may be adjusted to any desired point with reference to the mortising tools is similar in many respects to devices at present in use, and will not therefore be claimed.

Having thus described my invention what I claim as new and desire to secure by Letters Patent is—

1. Giving a forward and reverse movement to the chisel and auger by cam G', when the same receives its motion from the main shaft B, and a drum S, through the medium of friction wheel N, on a counter shaft, having one end under control of the operator so that said wheel may be forcibly brought into contact with either the drum or shaft by a rocking movement of the foot lever, at the option of the attendant, essentially as described and represented.

2. I claim giving a simultaneous reciprocating movement to belt wheel C, to that of the auger and chisel stock E, D, by means of the duplicate cam $G^2$, bar L, and yoke $h$, or their equivalents for the purposes and substantially as set forth.

LOVETT EAMES.

Witnesses:
R. T. CAMPBELL,
M. M. LIVINGSTON.